United States Patent [19]

Williams et al.

[11] Patent Number: 5,036,901
[45] Date of Patent: Aug. 6, 1991

[54] ELECTRONIC GAP SENSOR AND METHOD

[75] Inventors: Robert S. Williams, Fairfield; Edward L. King, Trenton; Steven L. Campbell, Middletown, all of Ohio

[73] Assignee: Armco Inc., Middletown, Ohio

[21] Appl. No.: 542,311

[22] Filed: Jun. 22, 1990

[51] Int. Cl.⁵ .................. B22D 11/06; B22D 11/16
[52] U.S. Cl. .................. 164/452; 164/150; 164/154; 164/463; 164/423
[58] Field of Search .............. 164/4.1, 451, 452, 453, 164/150, 154, 155, 423, 463, 479, 429

[56] References Cited

U.S. PATENT DOCUMENTS

| | | | |
|---|---|---|---|
| 2,383,310 | 8/1945 | Hazelett | 22/57.2 |
| 3,456,394 | 7/1969 | Welsh | 51/165 |
| 3,605,863 | 9/1971 | King | 164/156 |
| 4,399,861 | 8/1983 | Carlson | 164/453 |
| 4,433,715 | 2/1984 | Smith | 164/423 |
| 4,484,614 | 11/1984 | Maringer | 164/463 |
| 4,524,546 | 6/1985 | Hoover | 51/165 R |
| 4,715,428 | 12/1987 | Johns | 164/463 |
| 4,771,820 | 9/1988 | Williams | 164/463 |
| 4,791,979 | 12/1988 | Liebermann | 164/463 |
| 4,804,912 | 2/1989 | Lysen | 324/207 |
| 4,828,012 | 5/1989 | Honeycutt | 164/479 |
| 4,903,750 | 2/1990 | Ives | 164/150 |
| 4,924,172 | 5/1990 | Holmgren | 324/664 |

OTHER PUBLICATIONS

"Tool and Manufacturing Engineers Handbook", (3rd Ed., Soc. of Manuf. Engineers), Chapter 32, pp. 32-24 to 32-31.
Article, "Gaging Sheet Steel Works Rolls".

*Primary Examiner*—Kuang Y. Lin
*Attorney, Agent, or Firm*—Frost & Jacobs

[57] ABSTRACT

An apparatus and method for regulating the gap between a casting nozzle and a casting wheel in which the gap between the casting nozzle and the casting wheel is monitored by means of at least one sensing element protruding from the face of the casting nozzle. The sensing element is preferably connected to a voltage source and the casting wheel grounded. When the sensing element contacts the casting wheel, an electric circuit is completed. The completion of the circuit can be registered by an indicator, and the presence or absence of a completed circuit indicates the relative position of the casting nozzle to the casting wheel. The relative positions of the casting nozzle and casting wheel can thereby be selectively adjusted to continually maintain a predetermined distance between their adjacent surfaces.

26 Claims, 5 Drawing Sheets

ELECTRONIC GAP SENSOR AND METHOD

The U.S. Government has a paid-up license in this invention and the right in limited circumstances to require the patent owner to license others on reasonable terms as provided for by the terms of contract No. DE-FC07-88ID12712 awarded by the U.S. Department of Energy.

TECHNICAL FIELD

This invention relates to devices for monitoring the distance between two surfaces, and, more particularly, to a device having a protruding member which completes an electrical circuit when in contact with another surface. This invention has particular application for use in precisely controlling the distance between a casting nozzle and a casting wheel.

BACKGROUND ART

Generally, casting is the process by which molten material is formed into solid shapes. A known method for casting materials has involved the use of rolling cylinders to compress slabs of cast material to a desired thickness. However, this process is very energy intensive and costly.

An alternative casting method for producing a strip of material of a desired thickness, known as strip casting, incorporates a rotating wheel, drum, belt or other substrate. The rotating substrate is placed in close proximity to a casting nozzle from which molten material flows. The molten material is deposited on the rotating substrate where it cools, solidifies or "freezes", and is subsequently removed for further processing.

However, when the molten material is initially introduced through the casting nozzle and onto the casting wheel, heat is exchanged from the high temperature molten material to the lower temperature casting nozzle and casting wheel. This transfer of heat energy to the casting nozzle and the casting wheel causes them to expand, often in an unpredictable and non-uniform manner. As a result of this expansion, the distance between the adjacent surfaces of the casting wheel and the casting nozzle is often reduced.

Until the temperatures of the casting nozzle and the casting wheel reach a steady state, at which time further expansion of the casting nozzle and the casting wheel is minimized, the gap between them will not be a uniform or constant distance. In at least the case of planar flow casting, an example of which is illustrated in U.S. Pat. No. 4,771,820, the gap between the casting nozzle and the casting substrate can affect the thickness of the cast material, which is generally crucial to the quality of the cast material. If the cast material does not have the desired thickness, it may either be scrapped or mechanically reformed, both of which are expensive, time consuming, and inefficient.

The inability to control and maintain a desired distance or gap between the casting nozzle and the casting wheel can also cause a variety of other problems during casting. For example, if the distance between the casting nozzle and the casting wheel becomes too large, the molten material can flow along the face of the casting nozzle rather than onto the casting wheel. Material which is not deposited onto the casting wheel will inherently begin to cool as it flows along the nozzle, and can thereby interfere with the efficient operation of the machinery and compromise the quality and uniformity of the resultant cast product. Conversely, if a minimum gap between the casting nozzle and the casting wheel is not maintained, contact may occur between them which can result in severe damage to both the nozzle and the wheel. Such a situation obviously interferes with the safety and efficiency of the casting process.

In particular, when steel and other high temperature materials are strip cast, the relative expansions of the casting nozzle and casting wheel are virtually impossible to avoid. Since it is not generally economical to pre-heat a casting nozzle and a casting wheel to their steady state temperatures, a variety of methods have been used to measure and maintain the distance between a casting nozzle and a casting wheel. An example of an unique pneumatic device and method for monitoring and maintaining the distance between a casting nozzle and a surface of the casting wheel is disclosed in the commonly owned U.S. Patent Application entitled PNEUMATIC GAP SENSOR AND METHOD, filed concurrently herewith in the names of Karl T. Bagdal, Edward L. King, and Donald W. Follstaedt.

Some of the known methods include: product measurement, wherein the thickness of the cast material is measured downstream dynamically and the gap between the casting nozzle and casting wheel thereafter adjusted to compensate for measured thickness variations; and laser gap sensing, wherein a laser beam is utilized to measure the gap between the casting nozzle and the casting wheel.

All of the known methods and equipment have serious drawbacks, however. Indirect or downstream control of the distance between the casting nozzle and casting wheel from the downstream measurement of the resulting thickness of the cast material is complicated by the possible influence of other casting variables, such as casting speed, cooling, and composition, on the measured cast thickness. Moreover, downstream measurements are by definition "after the fact" quality controls, and undesirable rework or scrapping of the measured cast product is not avoided. Laser methods, on the other hand, are expensive and complicated to perform, especially for casts of wide strips of very hot alloys such as steel. In addition, lasers require a straight line of sight between the laser source and the photodiodes or similar laser detectors, through which the laser beam may travel. Unencumbered straight lines of sight are often not available between the expanding casting nozzle and substrate and, at least, difficult to provide. Moreover, the presence of smoke, heat, dust and other gases and particles produced during casting may interfere with (e.g. diffract) and restrict the passage of a laser light through the gap. Examples of devices of these types are disclosed in U.S. Pat. No. 2,383,310 and U.S. Pat. No. 4,399,861.

Consequently, heretofore, there has not been available a simple, reliable and economical device for maintaining a predetermined gap between two surfaces. In particular, such a device has not been available for use in hostile environments such as strip casting.

DISCLOSURE OF THE INVENTION

Accordingly, it is an object of the present invention to provide a device for measuring the distance between two surfaces which is relatively simple, economical and reliable.

It is another object of the present invention to provide a device for continually and accurately monitoring the distance between a casting nozzle and a casting substrate that will reliably operate in the hostile environment and extreme temperatures associated with casting.

It is yet another object of the present invention to provide an electronic gap sensor for determining the distance between a casting nozzle and a casting wheel by the completion of an electrical circuit between the casting nozzle and the casting wheel to indicate predetermined gap widths.

It is a further object of the present invention to provide a sensitive electronic gap sensor for determining the distance between a casting nozzle and a casting wheel by the completion of an electrical circuit between the casting nozzle and casting wheel, in conjunction with means for dynamically controlling the relative distance between the casting nozzle and the casting wheel.

It is still a further object of the present invention to provide a method for making real time adjustments to the relative distance between a casting nozzle and a casting wheel in response to input from one or more electronic gap sensors.

In accordance with one aspect of the present invention, there is provided a device and method for monitoring and regulating the gap between a casting nozzle and a casting wheel. The gap between the casting nozzle and the casting wheel is monitored by means of at least one sensing element mounted adjacent the face of the casting nozzle. The sensing element is preferably connected to a voltage source and the casting wheel electrically grounded. When the sensing element contacts the casting wheel, an electric circuit is completed, and the completion of the circuit can be registered by an indicator. The presence or absence of a completed circuit allows determination of the position of the casting nozzle relative to the casting wheel. The relative positions of the casting nozzle and casting wheel can then be selectively adjusted to maintain a predetermined distance between their adjacent surfaces.

BRIEF DESCRIPTION OF THE DRAWINGS

The following drawings incorporated in and forming a part of the specification illustrate several aspects of the present invention and together with the description serve to explain the principles of the invention. In the drawings.

DETAILED DESCRIPTION OF THE INVENTION

Figure 1:
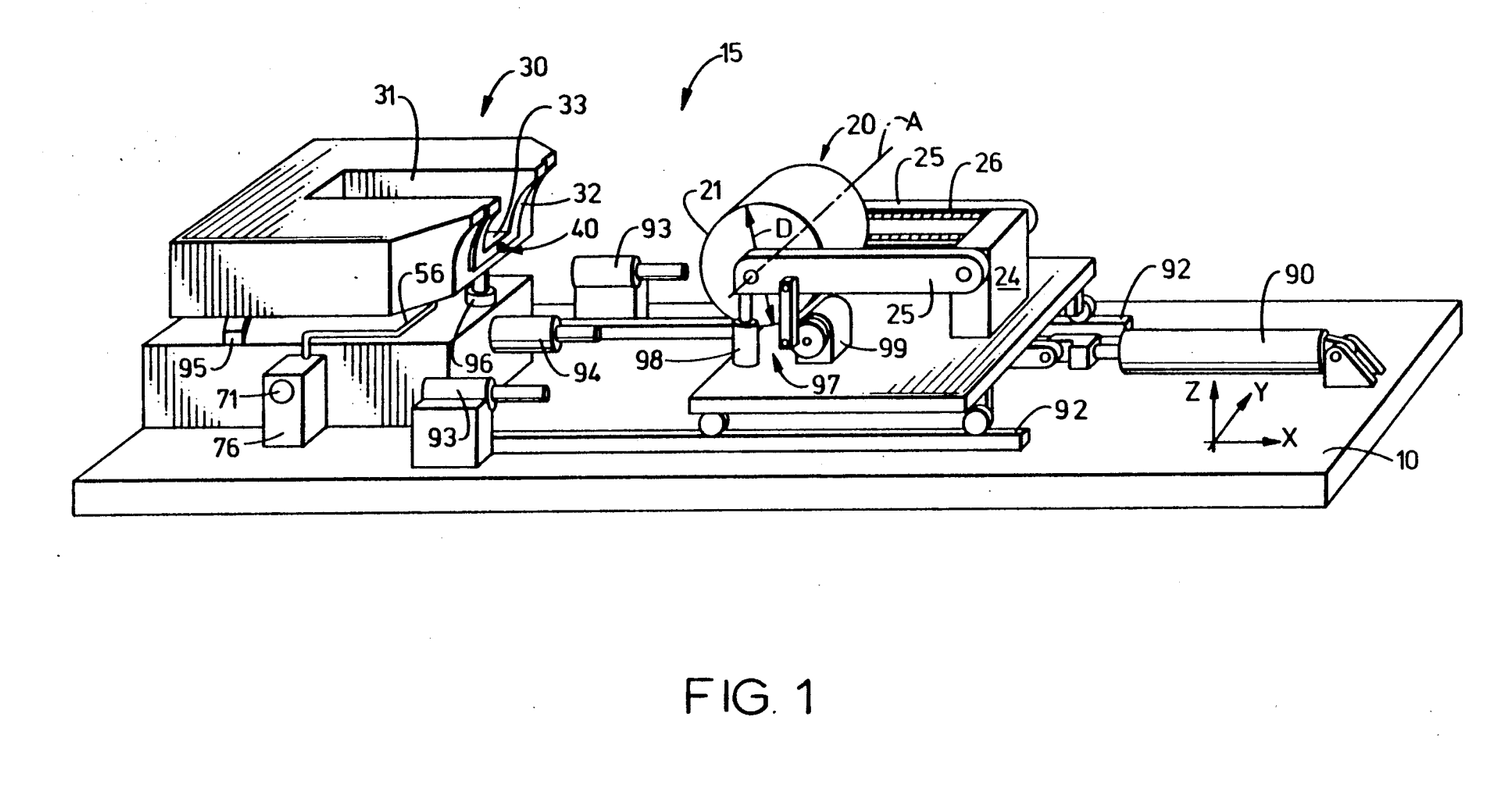
FIG. 1/is a partial perspective view of a casting station in which a preferred embodiment of the present invention is illustrated.

Referring now to the drawings in detail, wherein like numerals indicate corresponding elements throughout the views, FIG. 1 illustrates a partial perspective view of a casting station 15 located on a longitudinal bed 10. Casting station 15 will preferably comprise casting nozzle 30 and casting wheel or substrate 20. In a preferred embodiment, casting wheel 20 is rotatably mounted on arms 25 such that casting wheel 20 may be rotated by any means about an axis substantially parallel to the upper surface of longitudinal bed 10.

Arms 25 are rotatably mounted at one end to supporting block 24 such that arms 25 may be rotated in an arc having an axis substantially parallel to axis A of casting wheel 20. Supporting block 24 is securely attached to table 91 and may comprise a motor (not shown) for rotating wheel 20 by means such as drive linkage 26. Drive linkage 26 may comprise any coupling, belt, chain, rod or the like for rotating casting wheel 20. Alternatively, casting wheel 20 may be rotated by any means, such as a motor, provided along axis A of casting wheel 20.

Casting wheel 20 is preferably generally cylindrical in shape and rotatable about a central axis A. Casting wheel 20 is preferably rotated at between about 50-5000 feet/min. (15-1500 meters/min.) surface speed for typical strip or foil casting. Obviously such surface speed will be a function of the rotational speed of casting wheel 20 and diameter D thereof. However, as will become apparent herein, the present invention is not dependent upon the speed of the casting wheel.

It should be understood that configurations for substrate 20 other than cylindrical conformations may be employed. For example, a casting wheel with a smooth frustoconical outer peripheral surface or a belt-like continuous moving substrate (not shown) might equally be utilized. Regardless of the configuration of the wheel, drum, or other substrate employed, the casting surface should be at least as wide as the strip of material to be cast.

In a preferred embodiment, casting wheel 20 comprises a water cooled copper alloy wheel. Copper and copper alloys are preferably used for their high thermal and electric conductivity and favorable wear resistance. However, within the spirit of the present invention, steel, brass, aluminum, aluminum alloys, and other materials may equally be utilized. As will be seen, it is important that at least a portion of the surface of the substrate or wheel (e.g. 30) be capable of conducting electricity to complete an electrical circuit upon contact with a sensing element.

In the operation of strip casting station 15 such as shown in FIG. 1, the surface 21 of casting wheel 20 preferably must also be able to absorb and/or dissipate heat generated from contact with molten material in order to facilitate cooling of the cast material. As mentioned, in a preferred arrangement heat is removed from casting wheel 20 by circulating a sufficient quantity of water to the interior and/or exterior surfaces of casting wheel 20. Refrigeration techniques or similar cooling arrangements may also be employed to cool casting wheel 20. The use of cooling channels within a casting substrate is known in the industry and will not be further described herein. Likewise, casting wheel 20 may be cooled with the use of a medium other than water, including other cooling fluids such as freon, coolants, and the like. Water is chosen for its low cost, ready availability, and relative general safety.

During casting procedures, casting nozzle 30 is spaced in close proximity to surface 21 of casting wheel 20. Casting nozzle 30 is constructed of any material suitable for casting such as silica brick or the like. In general, for obvious reasons, such materials preferably have a melting point higher than that of the molten material to be introduced into the casting nozzle. Casting nozzle 30 may be of any suitable shape such that casting nozzle face 32 of casting nozzle 30 may be brought into close proximity with surface 21 of casting wheel 20 during casting. It is understood that casting nozzle 30 should be sufficiently warm before molten material is introduced therein so that the molten material does not generally solidify within channel 31 but instead flows onto substrate 20.

Casting nozzle face 32 preferably protrudes from the surface of casting nozzle 30 adjacent surface 21 so as to limit the overall area of nozzle 30 which will be in close proximity with surface 21 during casting operations. Due to the generally higher steady state temperature of casting nozzle 30 relative to the preferably cooler casting substrate 20, limiting the area of nozzle 30 in close proximity with surface 21 helps to minimize the transfer of heat energy from nozzle 30 to casting substrate 20. In addition, casting nozzle face 32 preferably has a conformation corresponding to and approximately the same radius of curvature as adjacent surface 21 of casting wheel 20, so that a predetermined distance can be substantially uniformly maintained between casting nozzle face 32 and the adjacent surface 21 of casting wheel 20 over substantially the entirety of these opposed surfaces.

Figure 2:
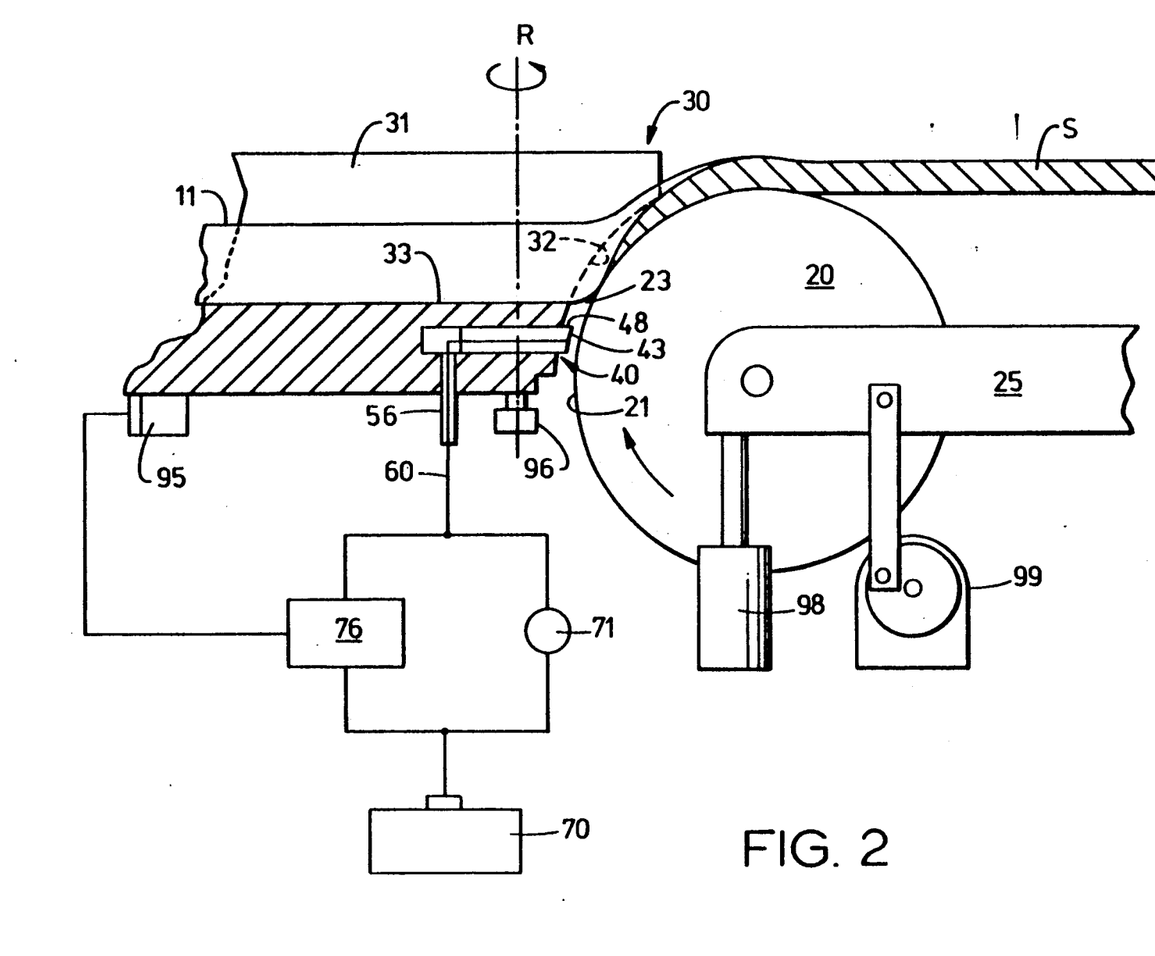
FIG. 2 is a partial cross-sectional schematic view of the casting station of FIG. 1.
Figure 3:
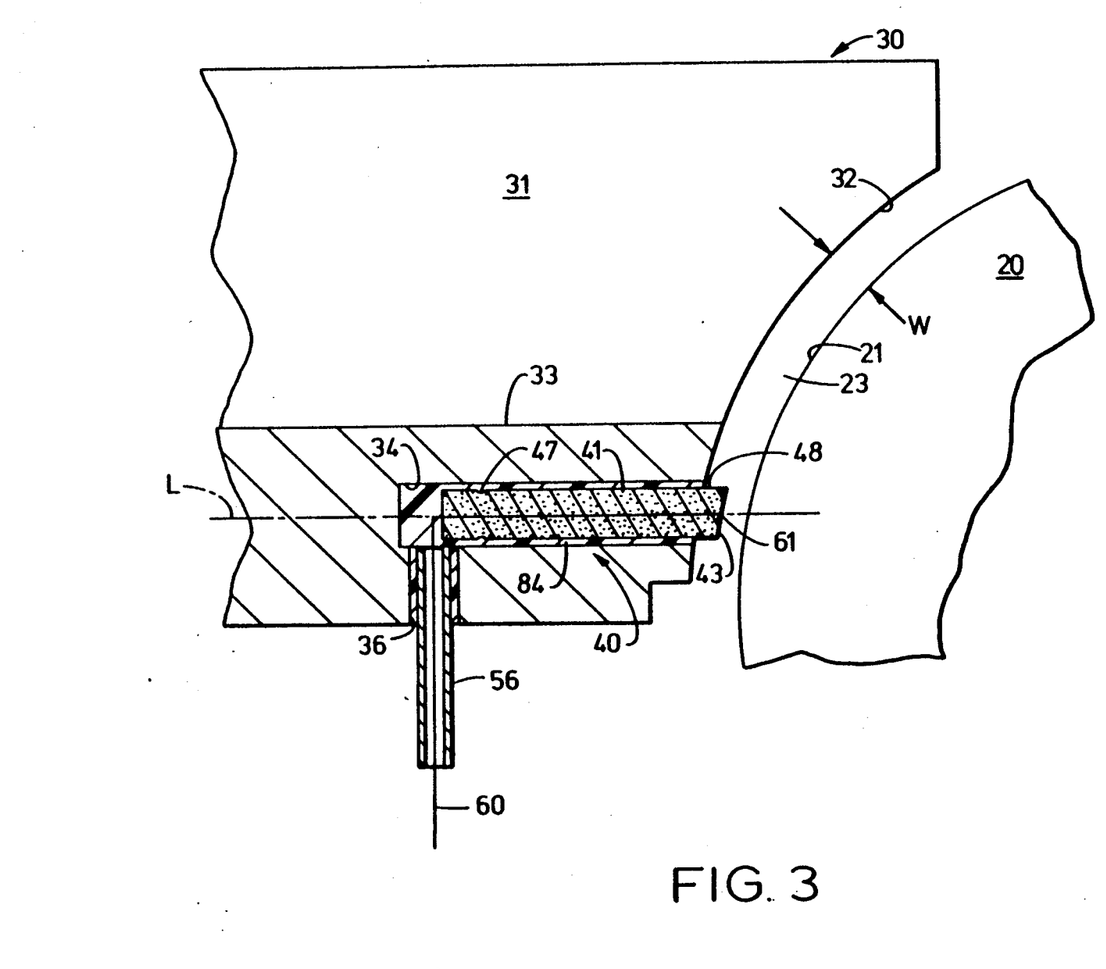
FIG. 3 is an enlarged cross-sectional view of the electronic gap sensor of FIGS. 1 and 2.

As illustrated in FIGS. 1-3, within casting nozzle 30 is preferably provided a channel 31 for directing the flow of molten material onto casting wheel 20. Channel 31 may be of any suitable shape to facilitate the flow of molten material towards casting wheel 20. As shown, bed 33 provides the lower portion of channel 31.

As best seen in FIG. 2, when molten material 11 is introduced into casting nozzle 30, it flows within channel 31, along bed 33, and onto casting wheel 20. A gap 23 is preferably maintained between casting wheel 20 and casting nozzle 30 so that casting wheel 20 may freely rotate and the desired thickness of material may be cast. Gap 23 is the distance between the closest opposed points on casting nozzle face 32 and surface 21 of casting wheel 20. During typical strip casting, gaps in a range of between about 0.005" (0.125 mm) and about 0.030" (0.75 mm) are usually desired. However, the invention disclosed herein is not theoretically limited by the dimension of gap 23 and may be generally utilized within the practical limits of molten material 11 flowing from casting nozzle 30 to casting wheel 20. As discussed herein, the present invention may be utilized when molten material 11 is cast at temperatures associated with red heat, typically over 1000° F. (over 604° C.).

Due to the flow, viscosity and inherent surface tension of molten material 11, the molten material effectively generally flows across gap 23 and onto casting wheel 20 as generally illustrated in FIG. 2. During casting, surface 21 of casting wheel 20 adjacent to bed 33 is rotating generally upwardly relative to bed 33 as it passes nozzle face 32 so that molten material 11 is deposited on casting wheel 20 and carried towards the top of the casting wheel. During casting operations, it is preferable to deposit molten material 11 on the upper quadrant of surface 21 adjacent to casting nozzle 30.

Referring now to FIG. 2, due to the cooling characteristics of casting wheel 20, molten material 11 generally begins solidification after initial contact with surface 21 of casting wheel 20. As shown with cross-hatching, as molten material 11 solidifies and cools on surface 21, molten material in contact with the solidified material likewise generally cools and solidifies on the previously deposited material, generally increasing the thickness of solidified material on surface 21 downstream. During typical drag flow casting, the resulting thickness of cast material produced is principally determined by the speed and temperature of surface 21 and the length of the arc over which molten material 11 contacts surface 21 and the solidified material thereon. In addition, the vertical sides of channel 31 adjacent to surface 21 may limit the transverse spreading (i.e. the lateral outward spreading from the sides of channel 31) of molten material 11 which has been deposited on substrate 20 yet has not solidified prior to exiting channel 31. Upon solidification, the cast material is thereafter removed from the casting wheel, as strip cast S.

In order to maintain gap 23 at a predetermined distance, a preferred embodiment of electronic gap sensor 40 of the subject invention is shown in FIGS. 1-3. At least one (and preferably a plurality of) gap sensor 40 will be provided to continually monitor gap 23 during casting procedures. Sensing element 60, which preferably comprises an electrical wire, will be described in greater detail below. As best seen in FIG. 3, sensor 40 preferably comprises a sensor body 41 and sensing element 60 and is provided adjacent casting nozzle face 32 such that the electrically conductive portion of surface 21 will pass in front of sensor 40 when in proximity. Sensor 40 is preferably secured to casting nozzle 30 such as within a cavity 34. Cavity 34 is preferably located beneath bed 33 to effectively space sensor 40 away from the flow of molten material, and to minimize the potential for direct contact with such molten material. It is also understood that cavity 34 and sensor 40 should be located sufficiently below bed 33 to avoid compromising the integrity of bed 33 (in applications where sensor 40 is actually mounted bodily within nozzle 30) so that molten material may flow thereover without damage to bed 33 or casting nozzle 30. Sensor 40 can operate reliably when located within about 0.5" (12.5 mm) of bed 33.

As mentioned, the present invention is constructed to withstand the hostile conditions and high temperatures associated with casting and may encounter temperatures over 1000° F. (over 604° C.) due to its proximity to molten material 11. Although the electronic sensor of the present invention may be mounted at a variety of positions on the exterior of casting nozzle 30 so long as the electrically conductive portion of surface 21 of casting wheel 20 travels in front thereof, it is preferred that sensor 40 be located as close as practical to the region where molten material is actually transferred from casting nozzle 30 to casting substrate 20. It is only by such proximate positioning that a true determination of the actual casting gap can be reliably achieved, and it is this close positioning that gauging devices and methods heretofore available have lacked and generally could not survive the attendant environment. In the preferred embodiment disclosed herein, sensor 40 is secured at least partially within nozzle 30, as illustrated in FIGS. 1-3.

Cavity 34 is generally cylindrical in shape and extends from casting nozzle face 32 inward into casting nozzle 30. It should be noted that cavity 34 may be of any shape (e.g. cylindrical, square, rectangular, etc.) appropriate for securing sensor body 41 therein. As shown in FIG. 3, sensor body 41 is also preferably generally cylindrical in shape, and is secured within cavity 34 such as by means of a high temperature refractory adhesive 84.

A depression or recess 47 is provided about a portion of sensor body 41 within casting nozzle 30. Depression 47 preferably circumscribes the exterior periphery of sensor body 41 and is preferably utilized where adhesive 84 will not rigidly attach to sensor body 41 or to augment the connection. When the adhesive within depression 47 hardens to the adjacent portion of cavity 34 in casting nozzle 30, it may thereby function as a mechanical lock for more rigidly securing sensor body 41 within cavity 34. However, any other attachment and/or securing means may be utilized for mounting sensor body 41 on nozzle 30.

One or more gap sensors 40 will be provided to continually monitor gap 23 during casting procedures. Sensor face 43, the distal end of sensor body 41 most closely adjacent to casting wheel 20, also preferably has a conformation corresponding to and of approximately the same radius of curvature as adjacent surface 21 of casting wheel 20. Where sensor face 43 is not provided with such conformation before installation of sensor body 41 within cavity 34, sensor face 43 may be appropriately dressed to proper conformation (as discussed herein) by placing an abrasive surface, such as emery paper, against the adjacent surface 21 of casting wheel 20. When surface 21 is brought into contact with sensor face 43, the abrasive surface will substantially conform to the curvature of adjacent surface 21 and may thereby be utilized to abrade sensor face 43 to the curvature of adjacent surface 21.

A passageway 36 is provided in casting nozzle 30 which communicates with cavity 34. Passageway 36 is also preferably generally cylindrical in shape; however, passageway 36 may be of any appropriate shape (e.g. cylindrical, square, rectangular, etc.) for securing a conduit 56 therein. As shown in FIG. 3, conduit 56 is also preferably generally cylindrical in shape, hollow, and secured within passageway 36 such as by means of a high temperature refractory adhesive. Any other attachment and/or securing means may be utilized for attaching conduit 56 within passageway 36. Conduit 56 may be of any appropriate shape such that a sensing element 60 may pass therethrough.

In the event casting nozzle 30 is electrically conductive, sensor body 41 and conduit 56 should comprise nonconductive elements to shield sensing element 60 from casting nozzle 30. In the event casting nozzle 30 is not electrically conductive, any suitable material may be used for those parts. As will be further discussed herein, it is preferable that sensor body 41 comprise a material with a low coefficient of thermal expansion so that the length of the portion (i.e. protrusion 48) of sensor body 41 extending outwardly from nozzle face 32 does not significantly change as sensor body 41 is exposed to temperature variations. The portion of sensor body 41 extending from casting nozzle face 32 must also be able to withstand the relatively hostile oxidation conditions created by the flow of molten material onto a cooler substrate. Sensor body 41 might preferably be formed of a material such as boron nitride for both conductive and nonconductive casting nozzles due to its nonconductivity, low coefficient of thermal expansion and superior resistance to oxidation. Conduit 56 preferably comprises a ceramic sheath although any appropriate material may be used.

In a preferred embodiment, sensing element 60 is housed within conduit 56 and sensor body 41, as best seen in FIG. 3. A longitudinal bore is preferably provided along the axis L of sensor body 41, within which sensing element 60 may be mounted. Sensing element 60 is constructed of an electrically conductive material, and preferably has a low coefficient of thermal expansion so that the distance which sensing tip 61 of sensing element 60 protrudes from casting nozzle face 32 does not significantly change as sensing element 60 is exposed to temperature variations. Sensing element 60 should also be able to withstand the oxidizing conditions present in casting procedures in general, and should be at least relatively resistant to wear as it may be in physical contact with surface 21 of casting wheel 20 from time to time.. In a preferred embodiment, sensing element 60 comprises platinum or nichrome wire, and is approximately 020" (0.5 mm) in diameter. Graphite, silver, nickel, or aluminum materials can also be used in appropriate applications. It should be noted that the exact diameter of the wire is not critical to the operation of the present invention.

Sensing element 60 should also be sufficiently resilient such that it will resist permanent deformation and resume its initial conformation after removal of a deforming force. Sensing tip 61 should correspondingly resume a predetermined distance from casting nozzle face 32 after removal of a deforming force. The support and resilience of sensing element 60 may be preferably aided by surrounding sensor body 41 extending from nozzle face 32 to sensing tip 61.

Sensing tip 61 of sensing element 60 terminates adjacent sensor face 43. As seen best in FIG. 3, sensing tip 61 and sensor face 43 of sensor body 41 extend outwardly a predetermined distance beyond casting nozzle face 32 towards surface 21 of casting wheel 20. Where sensing element 60 protrudes from nozzle face 32 in a direction substantially normal to nozzle face 32 and surface 21, the predetermined distance or length of protrusion 48 (i.e. that portion of the sensor body 41 and sensing tip 61 extending beyond casting nozzle face 32) is preferably equal to the desired width W of gap 23. However, sensing element 60 may extend from nozzle face 32 in a non-normal relationship as well. In those cases, the normal distance between sensing tip 61 and nozzle face 32 can be readily computed and accounted for using basic trigonometric algorithms. In practice, the desired distance sensing tip 61 extends from nozzle face 32 can be readily achieved during the shaping of sensor face 43, as discussed herein. A standard depth gauge may be used to monitor this distance as sensor face 43 is progressively dressed. This dressing operation is terminated when sensing tip 61 has a desired normal distance.

The proximal end of sensing element 60 extends from sensor body 41, and exits casting nozzle 30 through conduit 56. In a preferred embodiment, conduit 56 includes a longitudinal bore wherein sensing element 60 is mounted. The proximal end of sensing element 60 is connected to a control 76 and indicator 71 which are connected in parallel with voltage source 70, such as shown in FIG. 2. Also preferably connected to sensing element 60 is a control 76, and an indicator 71 (e.g. a lamp, buzzer, or the like) for registering the flow of current through sensing element 60.

In order to prevent the flow of current from voltage source 70 when sensing tip 61 is not in contact with grounded casting wheel 20, sensing element 60 must not be grounded. If casting nozzle 30 is not electrically conductive, the insulating features of sensor body 41 and conduit 56 may be essentially eliminated. The complete absence of sensor body 41 around sensing tip 61 may, however, Permit sensing tip 61 to deflect and/or bend such that protrusion 48 no longer equals the desired width W of gap 23. The length of the protruding portion of sensing element 60 could be calibrated based upon its deflection from a line substantially normal to nozzle face 32 and surface 21.

As shown in FIG. 2, control 76 is provided for operation of the means (e.g. 90, 95 and 97) for adjusting the relative position of casting nozzle face 32 to the adjacent surface 21 of casting wheel 20. In one embodiment of the present invention, operation of the adjustment means can be accomplished manually by an operator responding appropriately to contact signals from indicator 71. When the adjustment means is manually operated, indicator 71 is constructed to provide a signal perceptible by human senses, preferably either visual or audible. Accordingly, indicator 71 may be either a lamp or buzzer. As shown in FIG. 2, indicator 71 is connected to sensing element 60 such that the establishment of current in sensing element 60 will activate indicator 71. In a preferred embodiment, indicator 71 fails to produce a response when sensing tip 61 is not in contact with casting wheel 20. However, within the scope of this invention, any indicator arrangement can be used. For example, indicator 71 may be constructed such that a response (e.g. energization of a lamp or buzzer) is produced when current is not maintained or established in sensing element 60. It is thus understood that indicator 71 may respond to the relative presence (either the establishment or absence) of current in sensing element 60.

In an alternative embodiment of the present invention, control 76 comprises a computer and control relays. When sufficient electrical current is present in sensing element 60, a control relay preferably transmits a signal to the computer which thereafter makes appropriate adjustments to the relative positions of casting nozzle 30 and casting wheel 20.

When sensing tip 61 is in close proximity to surface 21, electrical current may arc from sensing tip 61 to surface 21. In such a case, the apparent width of gap 23 will not generally equal the actual distance sensing tip 61 protrudes from nozzle face 32. Since electrical arcing is generally unpredictable and may occur over a variety of distances, it is preferable that such arcing be minimized. In the preferred embodiment illustrated in FIG. 2, the current supplied by voltage source 70 is typically 24V DC when four sensors 40 are utilized. It is preferred that sensing element 60 be on the low voltage side of the current and that wheel 20 be at ground potential. As control 76 and indicator 71 generally have a relatively high electrical resistance (generally at least several hundred ohms), the total electrical current which may pass through sensing tip 61 is preferably small. The upper limit on this current can be calculated, assuming no resistance in sensing element 60, as equal to the supply voltage divided by the effective resistance of control 76 and indicator 71. As can be understood, supplying a low voltage to the sensing tip 61 reduces the possibility of arcing and attributes to the general safety and precision of the present invention. As used herein, relatively low voltage shall be understood to connote voltage which will produce an insignificant arc, preferably less than 5 volts.

Control 76 may be preferably designed such that the electrical potential of sensing tip 61 has a very low value before any control action is initiated. This reduces the possibility of premature movement of either nozzle 30 and/or substrate 20 caused by arcing from sensing tip 61 to surface 21 because the low voltage necessary to actuate control 76 is insufficient to sustain an arc. This low actuation voltage may be set such it is present in sensing element 60 only when sensing tip 61 is in physical contact with surface 21.

As shown in FIG. 1, a sensor 40 is provided on casting nozzle face 32 in close proximity to bed 33. Based upon the presence or absence of sufficient current in sensor element 60, casting nozzle 30 and casting wheel 20 can be continually adjusted during casting operations along essentially any plane or about any axis in the X-Y-Z triordinate system illustrated by a variety of mechanical means. Where only one sensor 40 is utilized, first axis adjustment means 90 is preferably provided to regulate the relative position of nozzle face 32 and surface 21 along the X axis. Although a variety of adjustment means may be utilized in conjunction with a single sensor 40, the contact of a sensing element 60 at a single location generally limits the information which may be obtained regarding the width W of gap 23 along other portions of nozzle face 23. Pivot point 96 and track 95 are provided to rotate nozzle 30 about point 96 to enable adjustments along the X and Y axes, while adjustment means 97 with arms 25 permit adjustment of wheel 20 along the X and Z axes.

When molten material is introduced through casting nozzle 30 and onto casting wheel 20, those areas of nozzle 30 and wheel 20 in closest proximity or contact with the molten material generally experience greater thermal expansion than the rest of nozzle 30 and substrate 20, respectively. In practice, the portions of nozzle 30 and substrate 20 generally located along the flow of the molten material expand the greatest such that the adjacent central portions of nozzle 30 and wheel 20 generally expand toward each other. During casting procedures, the width W of gap 23 between surface 21 and the centerpoint of bed 33 adjacent surface 21 is generally less than the width of a gap between surface 21 and a point located on the periphery of casting nozzle 30. Placement of sensor 40 near the centerpoint of bed 33 adjacent to surface 21 generally can help to ensure that casting nozzle 30 does not contact casting wheel 20.

Figure 4:
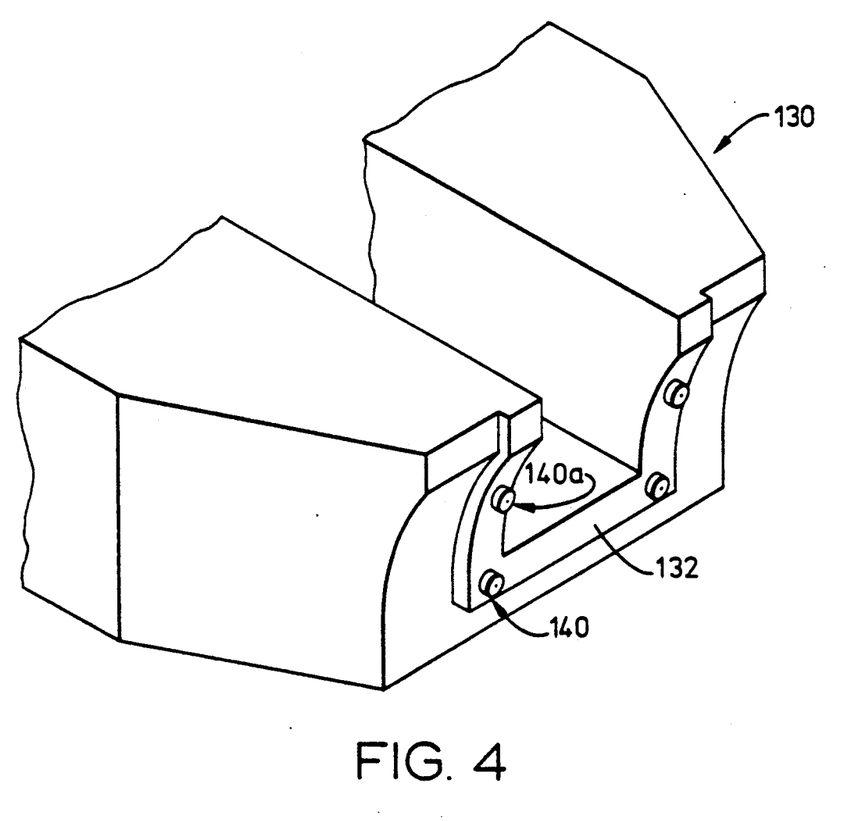
FIG. 4 is a partial perspective view of a casting nozzle incorporating an alternative preferred embodiment of, the present invention.

In another embodiment of the present invention, as illustrated in FIG. 4, more than one electronic gap sensor (e.g. 140) may be used with in conjunction with a casting nozzle (e.g. 130). Such an arrangement may be preferred for longer casting operations, or when casting wider or thicker casts, and/or where a plurality of adjustment means (e.g. 90, 95, and 97) are provided to maintain a predetermined variable width gap between nozzle face 132 and the surface of a casting substrate (not shown). In this alternative embodiment, electronic gap sensors 140 are installed in the casting nozzle 130 along the lower surface of casting nozzle face 132. As also illustrated, electronic gap sensors 140a may be installed on casting nozzle face 132 above the lower sensors. The use of a plurality of electronic gap sensors allows for the determination of whether specific portions of casting nozzle face 132 are a predetermined distance from a casting substrate (not shown) and can be utilized to maintain a gap with certain predetermined widths between the nozzle and the substrate.

Based upon the presence or absence of current in registered by the one or more electronic gap sensors, casting nozzle 30 can be continually dynamically adjusted during casting operations with respect to casting wheel 20 along a variety of orientation planes or axes by a variety of mechanical means. As shown in FIG. 1, casting wheel 20 is positioned on table 91 which is provided for translation along the X axis, such as on rails 92. Table 91 is connected to first axis adjustment means 90 which, in a preferred embodiment, comprises a hydraulic or pneumatic piston for selectively positioning wheel 20 relative to casting nozzle 30. When surface 21 of casting wheel 20 is in proximity with casting nozzle face 32, table 91 encounters load means 93, which are disposed beside rails 92.

As shown in FIG. 1, load means 93 may operate to provide a resistance to the movement of table 91 by adjustment means 90 towards casting nozzle 30 such that any slack in the system may be minimized and precise adjustments to the relative positions for nozzle face 32 and surface 21 can be made. Furthermore, in a preferred embodiment of the present invention, first axis adjustment means 90 and load means 93 are provided to maintain a constant force to table 91 such that any elastic deformation of table 91 is held constant during its translation.

In this preferred arrangement, an adjustable stop 94 is provided for precisely translating table 91. Where first adjustment means 90 provides a constant force greater than that provided by load means 93, table 91 is positioned into contact with adjustable stop 94 during the translation of table 91. Adjustable stop 94 may thereby precisely adjust the relative position of nozzle 30 and substrate 20 without generally further elastic deformation of table 91. Adjustable stop 94 preferably comprises any precise adjustment means such as a hydraulic or pneumatic piston, or ball screw arrangement.

Where it is desirable to further control gap 23, second adjustment means 97 may be provided, preferably comprising a lift 98 and a counterlift 99. Lift 98 is illustrated as comprising a hydraulic piston to raise casting wheel 20 along the Z axis and to provide a preloaded resistance to the downward movement of casting wheel 20 by counterlift 99 such that slack in second adjustment means 97 may be minimized.. Counterlift 99 comprises a motorized cam or any other precise adjustment device.

As described herein and illustrated in FIG. 2, the molten material 11 furthest away from bed 33 solidifies on previously deposited and partially solidified material. It can thus be understood that any potential transverse spreading of molten material deposited on surface 21 above bed 33 will be spaced somewhat away from the surface 21 and towards casting nozzle face 32. A larger gap may be maintained between the upper portions of casting nozzle face 32 and surface 23 than between bed 33 and surface 21 without transverse spreading of molten material on substrate 20. Second adjustment means 97 may thereby be utilized to maintain a gap between the upper portions of nozzle face 32 and surface 21 which is different than the gap between the lower portions of nozzle face 32 and surface 21.

Since it is not generally possible to maintain a uniform gap 23 between a nozzle face 32 and a surface 21, it may be preferable to maintain a uniform gap at the four corners defining the face of channel 31 adjacent to surface 21. This can be accomplished by utilizing the four sensors (e.g 140, 140a) illustrated in FIG. 4.

Further, means 95 for rotating casting nozzle 30 about a pivot 96 having an axis R substantially perpendicular to the upper surface of longitudinal bed 10 may be provided. Means 95 for rotating casting nozzle 30 preferably comprises a hydraulic or motorized device attached to casting nozzle 30. Due to the relative small arc through which casting nozzle 30 is rotating during casting, the distal end of nozzle 30 (the end opposite casting nozzle face 32) may alternatively be moved in a substantially straight line with a hydraulic or pneumatic device, a stepping motor, or the like (not shown). A powered rotating arrangement may alternatively be provided at pivot 96. As shown in FIG. 2, pivot 96 is preferably positioned such that casting nozzle 30 may rotate about an axis R substantially perpendicular to the upper surface of longitudinal bed 10 and located as close as practical to the midpoint of bed 33 closest to surface 21.

It is understood that any variety of devices may be utilized to position casting nozzle 30, casting wheel 20, or both, so as to maintain a predetermined relationship or gap 23 between them. These adjustment means can take the form of a precision ball screw arrangement, stepping motors or the like, hydraulic or pneumatic piston devices, or any other arrangement for altering the relative positions of casting nozzle 30 and casting wheel 20. Additional adjustment devices may also be provided to move or rotate casting nozzle 30 and/or casting wheel 20 along and about any axis.

Figure 5:
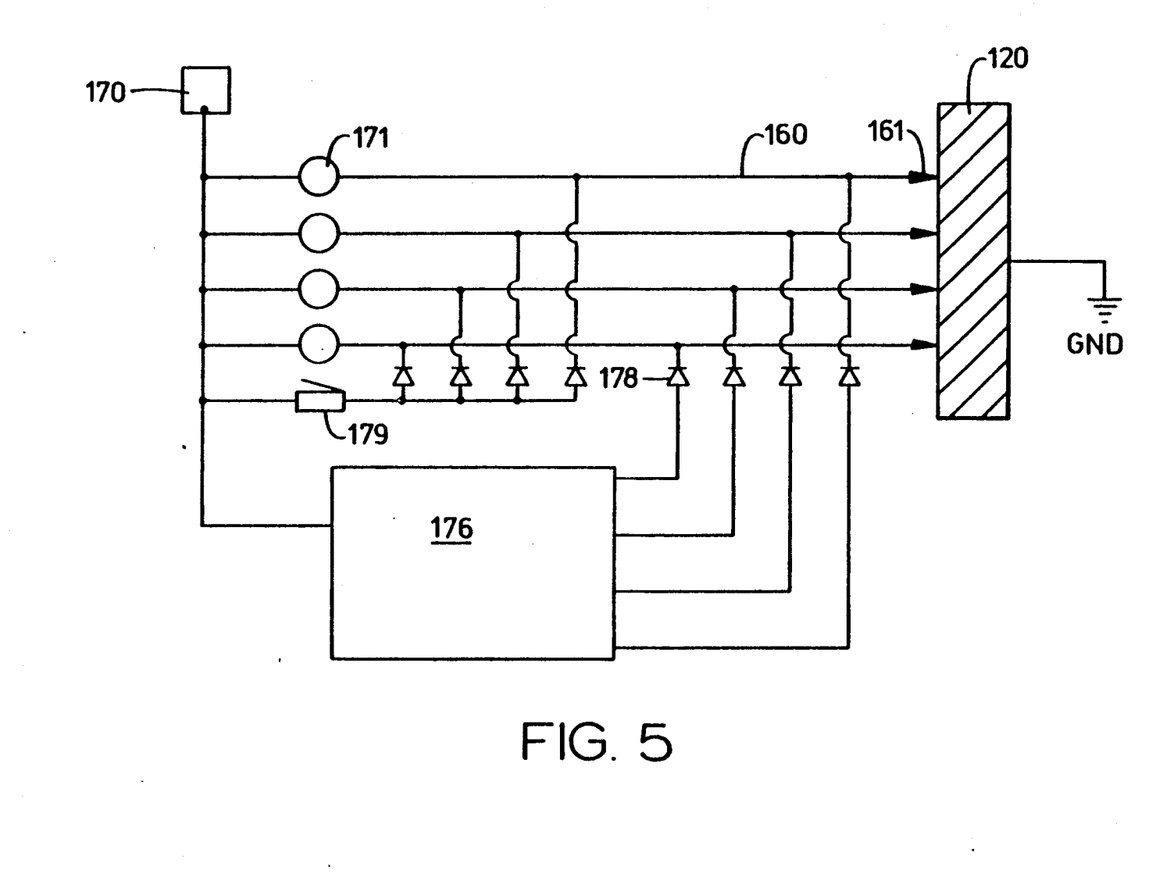
FIG. 5 is an electrical schematic illustration of a simple sensing circuit which can be used in accordance with the present invention.

An example of an electrical circuit which can be utilized with the alternative preferred embodiment of FIG. 4 is illustrated in FIG. 5 comprised of four electronic sensors. As shown and previously described, voltage from voltage source 170 is sent in parallel to indicators 171 and control 176. Diodes 178 are preferably provided with annunciator 179 and control 176 so as to direct the flow of current towards sensing tip 161. Annunciator 179 may be also provided with means for emitting an audible sound in reponse to the presence of current. As can be understood, indicator 171 and annunciator 179 are generally used for manual operation of the adjustment means and, when control 176 is automatic, may be eliminated. Since substrate 120 is electrically grounded, current may flow from sensing tip 161 to substrate 120 when in contact. When current is established in any sensor element 160, as shown, current flows to indicator 171 and control 176, which may adjust the casting nozzle and substrate as appropriate. A similar electrical circuit would also be applicable to the embodiment described above with regard to FIGS. 1–3. Furthermore, it is understood that any appropriate sensing circuit may be used to determine when the adjustment means should be operated.

The distance between casting nozzle face 32 and the surface of casting wheel 20 (i.e. width W of gap 23) may be adjusted based upon any pre-determined algorithm. If. casting wheel 20 is not perfectly cylindrical, indicator 71 will most likely initially register an intermittent current in sensing element 60 as sensing tip 61 makes initial contact with those portions of casting wheel 20 furthest away from its axis. So long as the relative positions of casting nozzle 30 and casting wheel 20 are maintained so that an intermittent current is observed, gap 23 should be equal to the desired distance within the runout or error in the circumference of the casting wheel surface.

Since casting nozzle 30 and casting wheel 20 will generally expand before reaching their steady state temperatures, gap 23 will usually decrease until steady state is reached. Therefore, an alternative method for utilizing the present invention is to move sensing tip 61 away from casting wheel 20 an incremental amount whenever contact between them is indicated. As the casting nozzle and casting wheel further expand, contact between sensing tip 61 and casting wheel 20 will occur, after which casting nozzle 30 may be further moved a small increment away from casting wheel 20.

Furthermore, within the spirit of the present invention, casting nozzle 30 may be provided with electronic gap sensors having a plurality of sensing tips extending outwardly at different lengths at any particular monitoring location (not shown). Since sensing tips of greater length will contact casting wheel 20 before those of shorter length, a range can be determined between which would exist the actual distance between the casting nozzle face and the surface of the casting wheel. This may allow for more accurate monitoring of the actual casting gap and/or differences in the gap across the interface between a nozzle and a casting wheel.

In addition, a failsafe electronic gap sensor may be provided with a casting nozzle (not shown) to insure that a pre-determined minimum gap is always maintained. Protrusion 48 of the failsafe electronic gap sensor would equal the minimum distance casting nozzle face 32 may approach the surface of casting wheel 20, and if the failsafe sensing tip contacts the casting wheel, gap 32 can be immediately increased or other action taken as appropriate. Such automatic remedial action can be programmed into the control program in a preferred arrangement.

Having shown and described the preferred embodiments of the present invention, further adaptions of the electronic gap sensor and invention described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawings.

We claim:

1. An apparatus for monitoring the gap between a casting nozzle and a casting surface of a substrate for, casting molten material, wherein the molten material is provided through the casting nozzle for casting onto the casting surface of the substrate for solidification and at least a portion of said casting surface is electrically conductive, said apparatus comprising:
   (a) a sensing element attached to said casting nozzle adjacent said gap and in proximity to and aligned with said electrically conductive portion of the casting surface of said substrate, said sensing element having a sensing tip extending outwardly a predetermined distance from said nozzle towards said casting surface;
   (b) a source of electrical voltage arranged such that upon effective contact of said sensing tip with said casting surface, an electrical current is established in said sensing element; and
   (c) wherein the presence of said electrical current can accurately indicate when the gap between said nozzle and said casting surface reaches a predetermined minimum distance.

2. The apparatus of claim 1, further comprising means for selectively adjusting the position of said nozzle relative to said substrate to correspondingly adjust said gap therebetween in response to the presence of said electrical current.

3. The apparatus of claim 1, wherein said voltage source provides electricity at a predetermined voltage to said sensing element.

4. The apparatus of claim 3, wherein said predetermined voltage is relatively low voltage in order to minimize safety concerns and to minimize potential for inaccurate sensing such as by arcing of the current between said sensing tip and said casting surface.

5. The apparatus of claim 1, wherein said sensing tip comprises an electrically conductive wire mounted at least partially within said nozzle.

6. The apparatus of claim 1, further, comprising a sensor body, wherein said sensing element is mounted at least partially within said sensor body.

7. The apparatus of claim 1 wherein said sensing element extends outwardly from said nozzle towards said casting surface along an axis substantially normal to said casting surface.

8. The apparatus of claim 2, further comprising means for controlling said adjusting means, wherein the position of said nozzle relative to said casting surface may be adjusted by a predetermined amount in response to determined changes in said gap during casting procedures.

9. The apparatus of claim 8, further comprising means for transmitting a signal to said controlling means to initiate adjustment of the position of said nozzle relative to said casting surface a predetermined amount in response to relative changes in said gap determined by said sensing element.

10. The apparatus of claim 1, wherein said nozzle comprises a bed over which molten material flows as it is discharged through said gap and onto said casting surface, and wherein said sensing element is mounted within said nozzle below said bed portion and extends outwardly from said nozzle toward said casting surface to monitor said gap in close proximity to where molten material from said nozzle contacts said casting surface during casting procedures.

11. The apparatus of claim 1, further comprising a plurality of sensing elements.

12. The apparatus of claim 11, further comprising at least one sensor body, said sensing elements mounted at least partially within said sensor bodies.

13. The apparatus of claim 6, wherein said sensor body is formed at least in part of boron nitride.

14. The apparatus of claim 1, wherein said substrate comprises a moving casting surface which is cooled to facilitate solidification of said molten material as it is cast onto said casting surface during casting procedures.

15. The apparatus of claim 8, further comprising means for implementing adjustment of said relative positions of said nozzle and said casting surface as necessary to maintain a predetermined gap therebetween.

16. The apparatus of claim 11, wherein said sensing elements are spaced from one another on said nozzle to monitor the gap between said nozzle and said casting surface along a plurality of axes.

17. The apparatus of claim 16, wherein said adjusting means further comprises an arrangement for adjusting the relative positions of the nozzle and casting surface along a plurality of axes in order to facilitate more uniform control of said gap between these parts during casting procedures.

18. An apparatus for monitoring the gap between a casting nozzle and a casting surface of a substrate during casting of molten material, wherein the molten material is provided through the casting nozzle for casting onto the casting surface of the substrate for solidification and at least a portion of said casting surface is electrically conductive, said apparatus comprising:
(a) a plurality of sensing elements attached to said casting nozzle adjacent said gap and in proximity to and aligned with said electrically conductive portion of the casting surface of said substrate, said sensing elements each having a sensing tip extending outwardly a separately predetermined distance from said nozzle towards said casting surface;
(b) a source of electrical voltage arranged such that upon effective contact of each said sensing tip with said casting surface, an electrical current is established in each such sensing element;
(c) wherein the presence of each such electrical current can accurately indicate when a gap between said nozzle and said casting surface reaches a predetermined minimum distance; and
(d) means for selectively adjusting the position of said nozzle relative to said substrate to corresponding adjust said gap therebetween.

19. The apparatus of claim 18, further comprising means for controlling said adjusting means, wherein the position of said nozzle relative to said casting surface may be adjusted by a predetermined amount in response to relative changes in said gap determined by said sensing elements.

20. The apparatus of claim 18, wherein said sensing elements are spaced from one another on said nozzle to monitor the gap between said nozzle and said casting surface along a plurality of axes.

21. The apparatus of claim 20, wherein said adjusting means further comprises an arrangement for adjusting the relative positions of the nozzle and casting surface along a plurality of axes in order to facilitate more uniform control of said gap between these parts during casting procedures.

22. A method for monitoring the gap between a casting nozzle and a casting surface of a substrate for continuous casting of molten material, at least a portion of said casting surface being electrically conductive, said method comprising the following steps:

(a) providing a casting nozzle having a sensing element attached to said casting nozzle adjacent said gap and in proximity to and aligned with said electrically conductive portion of the casting surface of said substrate, said sensing element having a sensing tip extending outwardly a predetermined distance from said nozzle towards said casting surface, and having a source of electrical voltage arranged such that upon effective contact of said sensing tip with said casting surface, an electrical current is established in said sensing element, wherein establishment of said electrical current can accurately indicate when the gap between said nozzle and said casting surface reaches a predetermined minimum distance;
(b) locating said nozzle and said casting surface in proximity with one another such that said sensing element indicates contact with said casting surface;
(c) adjusting the relative positions of said nozzle and said casting surface to provide a predetermined gap therebetween;
(d) providing molten material to said nozzle for casting onto said casting surface; and
(e) monitoring the gap between said nozzle and said casting surface during casting procedures, whereby contact of said sensing tip with said casting surface establishes said electrical current.

23. The method of claim 22, further comprising the step of implementing said adjusting means to selectively adjust the position of said nozzle relative to said casting surface in response to said electrical current indication of contact.

24. The method of claim 23, wherein said casting nozzle is provided with a plurality of sensing elements spaced from one another such that the gap between said nozzle and said casting surface can be monitored along a plurality of axes.

25. The method of claim 24, wherein said step of implementing said adjusting means enables adjustment of the relative positions of said nozzle and said casting surface along a plurality of axes in order to facilitate more uniform control of said gap between these parts during casting procedures.

26. The apparatus of claim 1, wherein said sensing element is formed at least in part of platinum.

* * * * *